Figure 1:
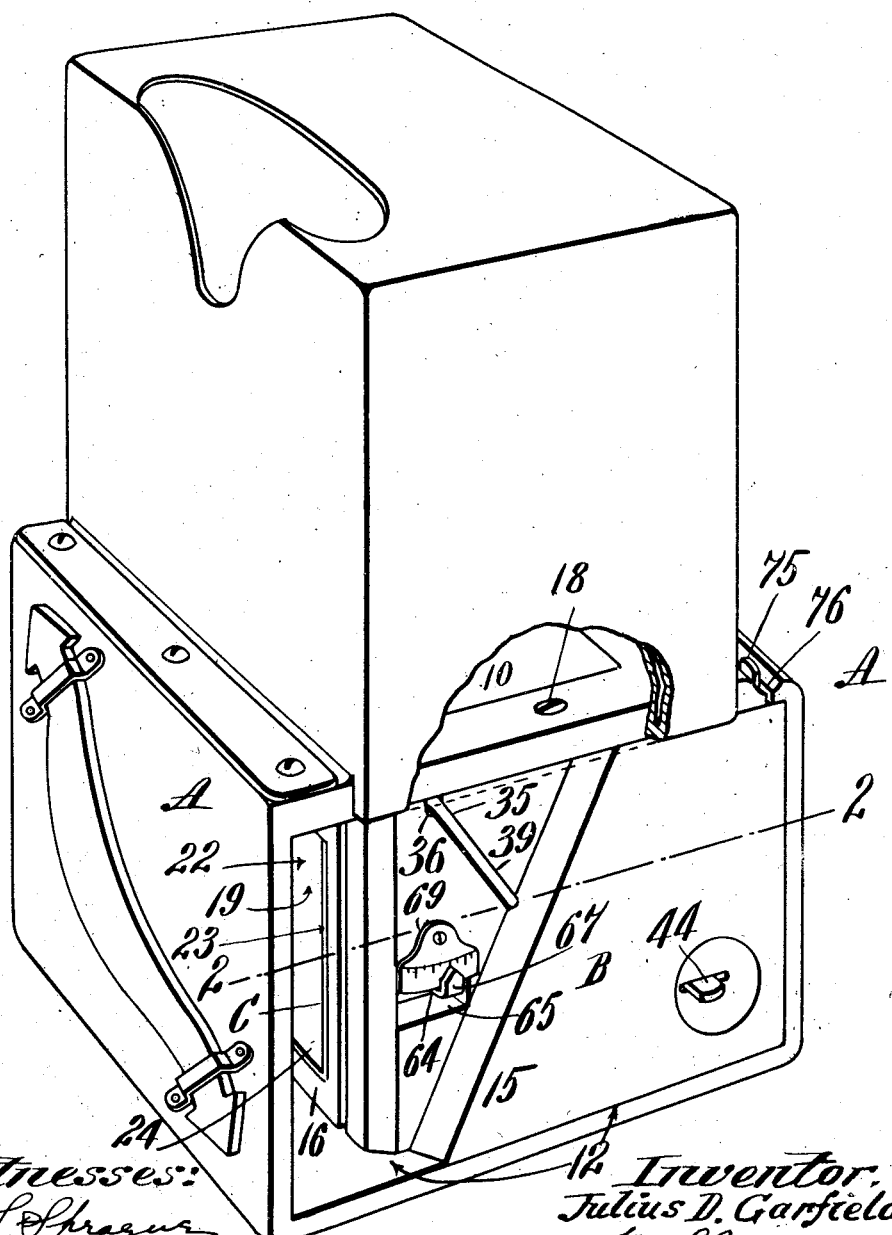

No. 882,307. PATENTED MAR. 17, 1908.
J. D. GARFIELD.
LENS SHUTTER REFLECTING CAMERA.
APPLICATION FILED SEPT. 3, 1907.
4 SHEETS—SHEET 1.

Witnesses:
H. L. Sprague
C. R. Driscoll

Inventor,
Julius D. Garfield,
by
Attorney.

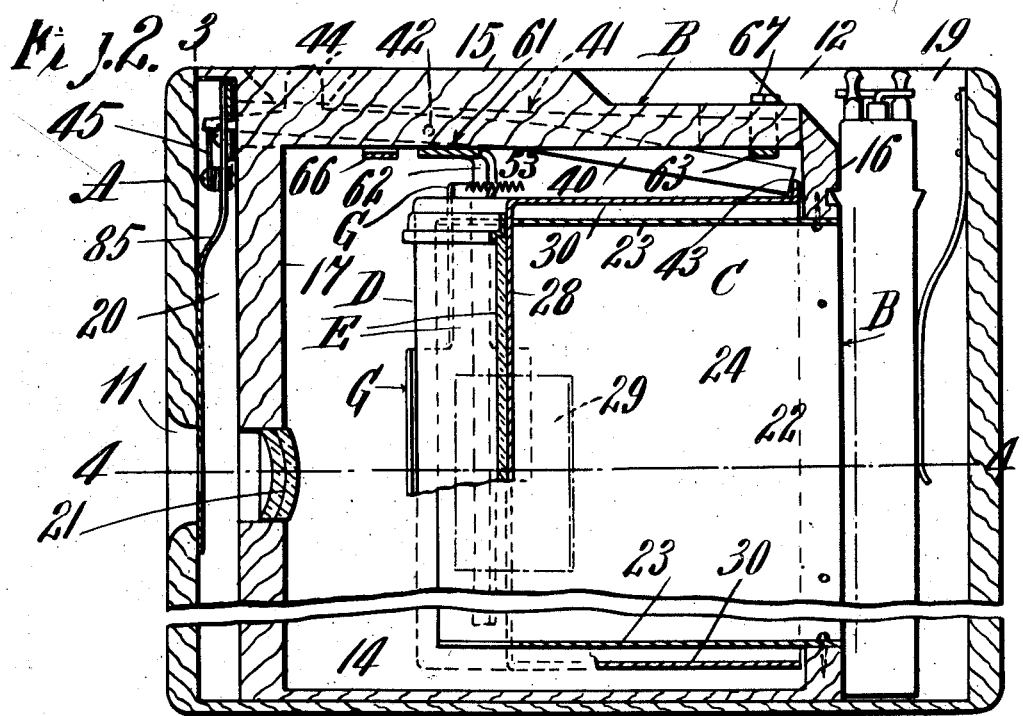

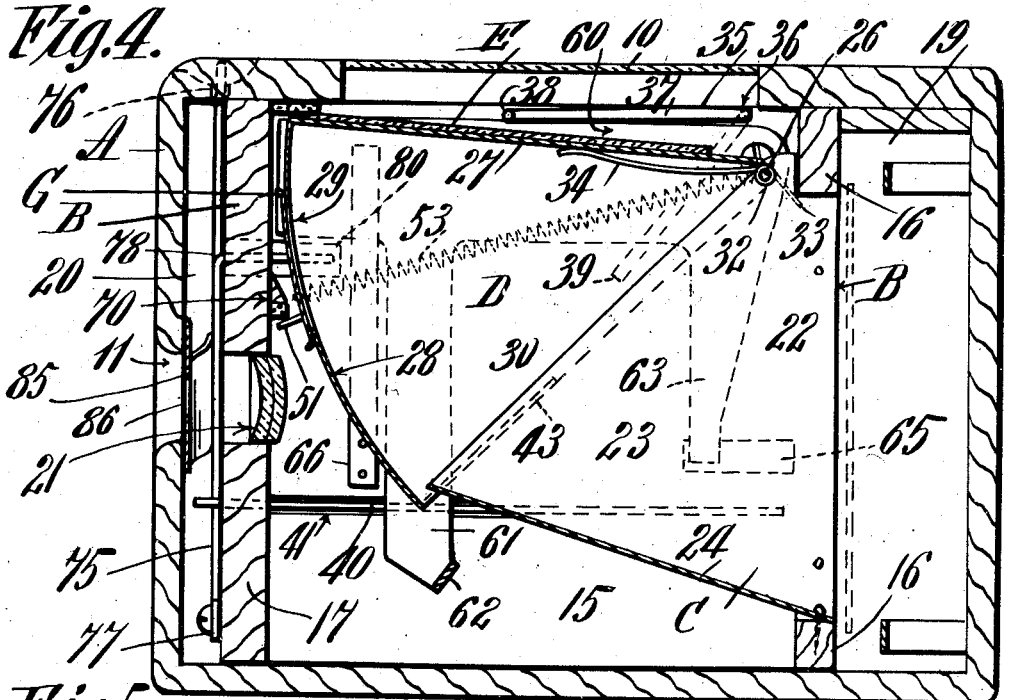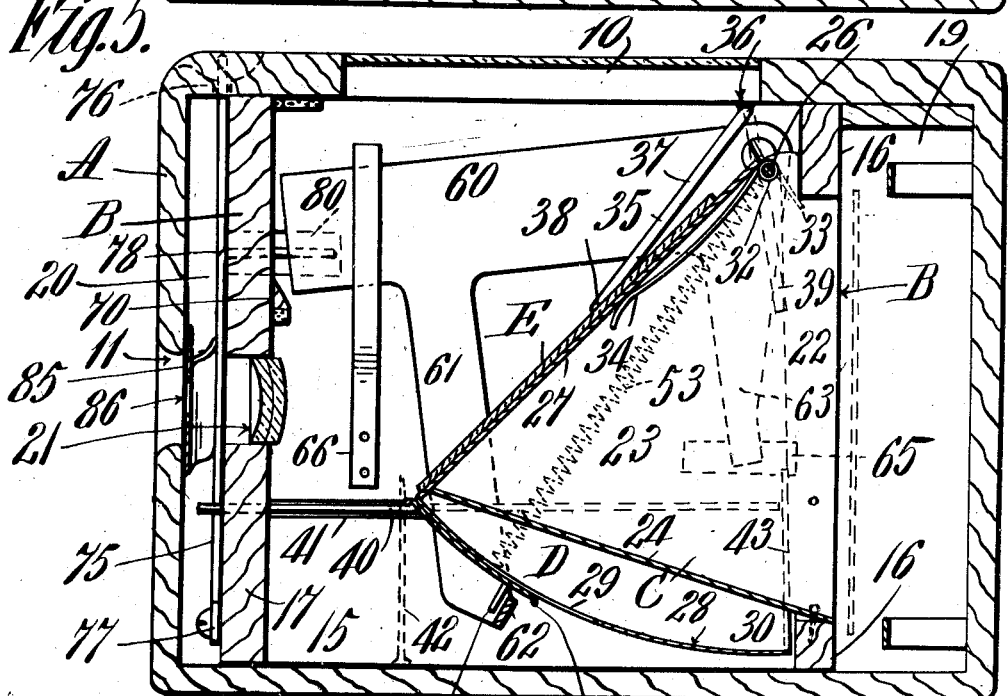

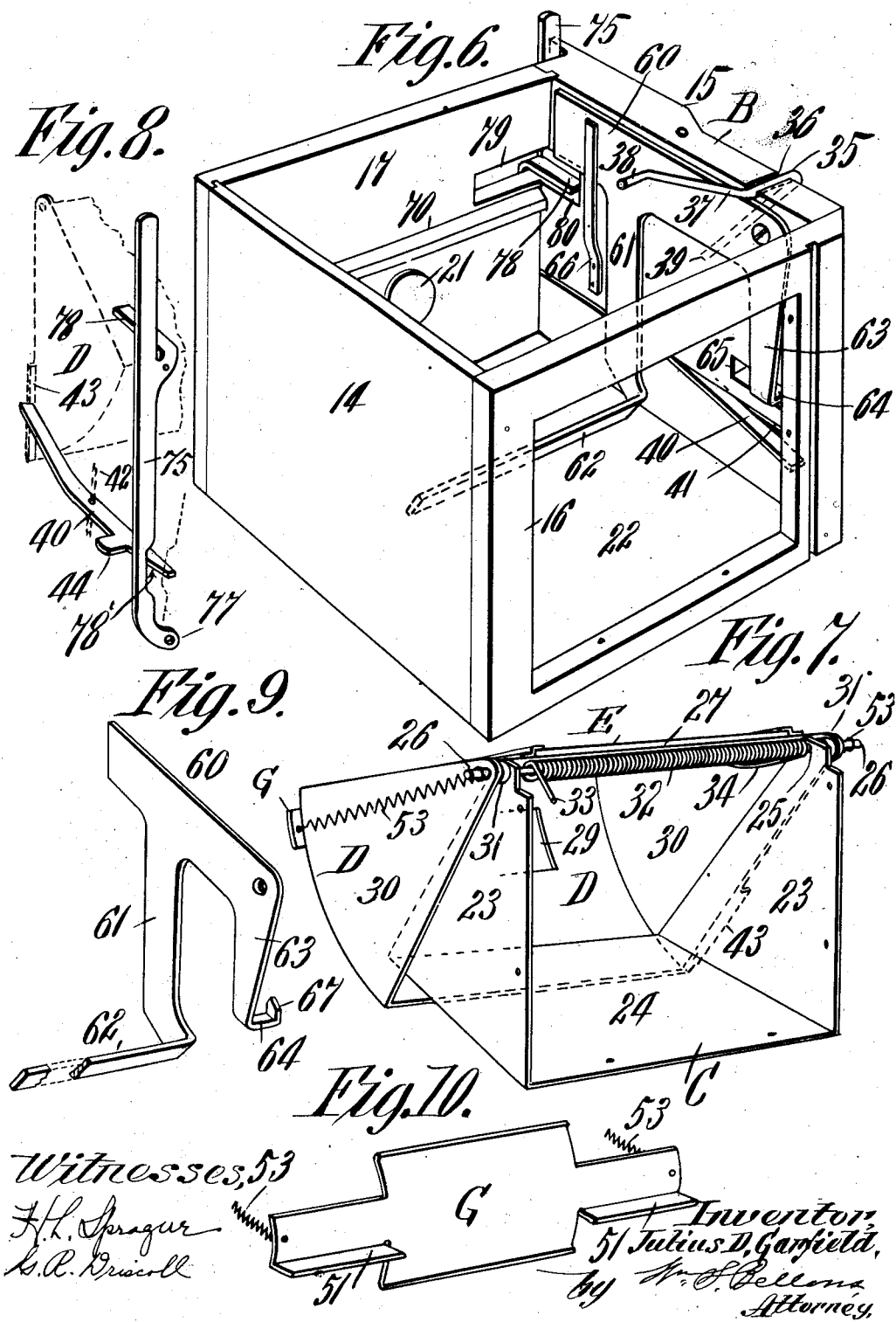

UNITED STATES PATENT OFFICE.

JULIUS D. GARFIELD, OF SPRINGFIELD, MASSACHUSETTS.

LENS-SHUTTER REFLECTING-CAMERA.

No. 882,307.	Specification of Letters Patent.	Patented March 17, 1908.

Application filed September 3, 1907. Serial No. 391,115.

*To all whom it may concern:*

Be it known that I, JULIUS D. GARFIELD, a citizen of the United States of America, and resident of Springfield, in the county of Hampden and State of Massachusetts, have invented certain new and useful Improvements in Lens-Shutter Reflecting-Cameras, of which the following is a full, clear, and exact description.

This invention relates to photographic cameras, particularly reflecting cameras; and a leading purpose of the invention is to provide a combined lens shutter and mirror support having coacting light excluding devices whereby uncovered photographic plates or films within the camera are absolutely protected from light entering through the ground-glass screen or other openings and through the lens during the setting of the mirror and shutter.

Another object of the invention is to provide the part, which constitutes both the mirror-support and shutter, with a spring-pressed friction slide for automatically closing the shutter opening previous to the setting of the mirror and shutter, together with means controlled from the outside of the camera for automatically uncovering any predetermined portion of the shutter opening during the latter portion of the shutter-setting movement.

Other objects of the invention are attained principally in and by the construction and arrangement of the various levers for setting and releasing the mirror support and shutter by means of which so called "instantaneous" exposures of varying speed, as well as "time" exposures, may be accurately made.

The invention consists in the arrangements or combinations of parts, and in the construction of certain of the parts, all substantially as hereinafter fully described, and set forth in the claims.

In the drawings,—Figure 1 is a perspective view of the camera, a portion of the shading hood thereof being shown as broken away. Fig. 2 is a horizontal section on the line 2—2, Fig. 1. Fig. 3 is a sectional front elevation as seen inwardly from the plane indicated by line 3—3, Fig. 2. Fig. 4 is a longitudinal vertical section through a camera embodying my improvements, taken on line 4—4, Fig. 2, the mirror and shutter and parts coacting therewith being shown as in their normal, or closed position. Fig. 5 is a similar view to Fig. 4,—taken on the same plane,—the mirror and shutter and coacting parts being shown as in their depressed or "set" position. Fig. 6 is a perspective view of the inside frame of the camera, the several levers and operating parts being shown in their operative positions, the mirror, shutter, and light shield being removed. Fig. 7 is a perspective view of the mirror support and shutter shown as in assembled relation with the light shield. Fig. 8 is a perspective view of the "time" and "instantaneous" release levers shown in the positions which they occupy relative to each other and to the mirror support (the latter being shown in dotted line). Fig. 9 is a perspective view of the adjustable shutter-slide opener, and Fig. 10 is a perspective view of the shutter slide.

Similar characters of reference indicate corresponding parts in all of the views.

In the drawings—A represents the camera-box comprising top and bottom walls united by front and end and one side wall. The top wall has a rectangular opening in which is horizontally mounted a ground glass screen 10. The front wall is provided with a circular opening 11 through which light passes to the photographic lens.

The open side 12 of the box A (see Figs. 1 and 2) is made to receive an inner box-like frame B, which is easily inserted therewithin. This frame B comprises two side walls 14 and 15, a rear frame-like wall 16, and a front wall 17.

The height and width of frame B is such that it fits snugly within the forward portion of box A where it is secured by a screw 18, Fig. 1, and the length, or front to rear dimension, is somewhat less than that of box A, whereby a space 19 is provided at the rear portion of the camera for the reception of a plate-holder or film pack holder.

The front wall 17 of frame B is connected to the side wall 15 of such frame at a point somewhat back from its forward edge, thus providing a narrow space 20 between the front walls of the camera box A and the frame B.

The front wall 17 of the frame B also carries in a suitable opening therein the photographic lens 21.

The rear wall 16 has provided therein a rectangular opening 22, of an area approximately that of the photographic plate which the camera is provided for.

A part, constituting, in the present instance, both light-shield and shutter-support C, which consists of two angularly shaped side plates 23, 23, (the angle of their forward edges being approximately 45 degrees relative to the vertical rear edges) and an upwardly inclined bottom plate 24, is immovably attached by nails or otherwise to the inner side and bottom edges of the rear frame opening 22 (see Figs. 1, 2, 4 and 5).

The side plates 23, 23, and the bottom plate 24 of the light-shield C are preferably made in one piece, that is, blanked out and formed or bent up from a single piece of sheet metal; or the bottom plate 24 may be united in any suitable way to the lower edges of the side plates 23, 23; but in all cases the bottom and side plates are rigidly connected so as to constitute an immovable structure with no openings or interstices within the area of the sides or uniting bottom to permit light to pass therethrough (see Fig. 7).

Supported in perforations or bearings 25 in the upper end portion of the triangular sides of the plates 23, 23, of the light shield is a slender but rigid shaft 26, the ends of which project through the side plates 23, 23, some little distance, as shown in Fig. 7.

Pivotally supported on the above described projecting ends of the shaft 26, is the combined mirror-support and shutter D.

While the general form and construction of this mirror-carrying shutter in itself is not new, it will be particularly described, as to the novel manner in which I utilize it in connection with the above described light-shield C, the combination and relative arrangement of which parts form an important portion of my invention.

The shutter D, as I prefer to make it, comprises a flat top plate 27, on which, by means of suitable cleats, is secured the mirror E, (see Figs. 2, 4, 5 and 7), a curved front plate 28, having the shutter opening 29 formed therein as shown, and two segmental side plates 30, the angularly adjoining edges of the sides, and front and top plates being united in a light-tight manner.

The width of the shutter D is slightly greater than the distance between the side plates 23, 23, of the light-shield, and the side plates 30 of the shutter are equally distanced from the plates 23 and so maintained by interposed washers 31 on the shaft.

On that portion of the shaft 26 lying under the rear edge of the top-plate 27 of the shutter, and between the shaft bearings 25, in the upper portion of the light-side plates 23, 23, is provided the spirally wound torsion spring 32 for raising the shutter D in making an exposure. The free end 33 of this spring 32 is anchored against the rear wall 16 of the frame B, and its other free-end 34 presses upwardly against the under side of the top-plate 27 of the shutter D, see Figs. 4, 5 and 7.

A shutter setting-lever 35, of heavy wire is supported at its central horizontal portion in a groove bearing 36,—Figs. 1 and 6,— in the upper edge of the side wall 15, of the inner frame B, and has one angularly bent end member 37 located within the camera, a short right-angular bent end 38 of which overhangs and is adapted to engage the adjacent upper corner portion of the shutter D; the other end portion 39 of the said lever 35 is located outside the camera, and is also angularly made, the form of bend given this outside lever-arm 39 being such as to permit its lying closely to the outer surface of the side wall 15 of the camera, which, as shown in Figs. 1, 2 and 6, of the drawings, is of reduced thickness at this point thereby obviating the undesirable protruding of the lever arm beyond the general side surface of the camera.

To provide a simple and reliable means for holding the mirror and shutter E and D in their "set", or lower, position against the upward pressure of the spring 32, as well as an efficient means for releasing the same, I employ, as seen in Figs. 2 to 6, and Fig. 8, a horizontally disposed pivoted lever 40, which is guided and supported in a groove 41 in the lower portion of the side wall 15 of frame B, and which extends from a point in front of and adjacent the rear wall 16 of the said frame B, to and into the before mentioned narrow space 20, at the front end portion of the camera. The rear end of this pivoted lever 40 is adapted to engage a flange or rib 43, formed on the adjacent side plate 30 of the shutter D to the end that the forward and upward tendency of the spring pressure on the said shutter when in its set position is received by the lever 40 and the consequent end thrust thereon is resisted by its pivot pin 42,—see Fig. 2.

A short right-angularly projecting press button 44 formed on the lever 40, adjacent the forward end thereof projects through the side of the camera wall into a depression provided therefor, of convenient dimensions whereby the lever may be operated by a finger pressure against the outward stress on said press-button 44, produced by the action of the lever spring 45, which engages the front end portion of the pivoted lever 40, as clearly shown in Fig. 3.

An important adjunct of the shutter D, which will now be described, is the shutter-slide G and its coacting parts, by means of which the shutter opening 29 is not only uncovered when the shutter is set, and instantly closed after the shutter has been released (for the exposure of the photographic plate) and swung to its raised position, but by means of which any predetermined extent of uncovering of the shutter opening 29 may be effected. This slide G, Fig. 10, consists essentially of a thin sheet metal plate bent to a curve corresponding to the plate 28 of the shutter D, and of a length slightly greater than the width of the said shutter and of a width vertically somewhat greater than that of the shutter opening 29. The end portions of this plate, which practicably may be somewhat narrower or more slender than the central portion have angularly bent lips or flanges 51, 51, formed thereon, as shown in the various figures of the drawing.

At the extreme end portions of the slide G are attached in any suitable way the free ends of the sidewise arranged spiral springs 53, 53, the other or substantially stationary ends of the said springs being attached to the extremities of the shaft 26. These springs 53, 53, are preferably made of very fine wire and are of such a length as to require but a slight distension to enable them to hold the slide G firmly, but slidably against the curved plate 28 of the shutter D.

The means which I employ to move the slide G at the termination of the setting operation of the shutter D, to uncover the shutter opening 29, consists of a frame-like plate 60 which is pivotally secured to the side wall 15 of frame B (see Figs. 4 and 5) and has a downwardly extending member 61 formed thereon adjacent the forward or free end thereof; and at the lower end of this member 61 is a right angular extension 62 which acts as, and will be hereafter termed, the "slide opener."

A second downwardly extending member 63, formed on the plate 60 adjacent the pivot end thereof has at its lower end an angular bent part 64 which projects through an opening 65, in the side wall 15, to the outside of the camera, where it is then upwardly bent to form a pointer 67, and also serves as a means for swinging the slide-opener 60 on its pivot 65, thereby positioning the extension member 62, relative to the shutter opening 29, to the end that the shutter slide flanges 51, 51, are brought to engagement with the member 62, on the downward or setting movement of the shutter, and the shutter slide G being thus arrested in its downward movement with the shutter, has relatively a sliding movement from its position over the shutter opening 29, and uncovers the same to an extent proportionate to the position the slide-opener has been brought to.

In order that a sufficient frictional resistance between the slide-opener plate 60 and the surface of the side-wall 15 may be maintained (which is necessary in order that the member 62 may be held without accidental displacement in any desired position), a flat spring 66 which is located adjacent the forward or free end of the plate 60, is adjusted to bear with considerable pressure thereon. In connection with the before-mentioned pointer 67, on the outside of the camera a curved edged plate 69, bearing graduations or indications to show the position of the slide opener 62, is provided (see Fig. 1), whereby to give a knowledge of the width of the shutter opening.

The means for closing the shutter opening 29, by the shutter-slide G, at the termination of an exposure, as illustrated in Fig. 4, is by means of a cushioned rib 70, which extends across the front wall 17 of frame B, and being located in the path of the flanges 51, 51, of the shutter slide G engages them on the upward swing of the shutter D, and causes the slide G to remain stationary during the latter part of the upward movement of the shutter D, thereby covering the opening 29 so that during the setting or downward movement of the shutter no light from the lens, or elsewhere, can pass therethrough. The above description of the closing of the shutter opening at the termination of an exposure refers solely to the taking of "instantaneous" exposures.

The separate devices working in connection with those already alluded to, which I employ for making "time" exposures will now be described.

The time lever 75, by means of which the entire operation of making a "time" exposure is accomplished, is, as a reference to Figs. 3 and 8 of the drawings will best illustrate, pivotally mounted at its lower end on the forward side of the front wall 17 of frame B, and extends upwardly through a slot 76 in the top wall of the camera box A.

The straight upper portion of this lever 75 stands normally in line with, and close against, the thin forward edge portion of the inner side wall 15 of the frame B, the lower end of the lever being curved towards its pivotal point 77.

A recessed portion of the time lever 75 adjacent the protruding end of the release lever 40, provides a small space 78', for lost action, between the time lever and the end of the release lever, see Fig. 8.

At a point on lever 75 about midway between its top end and the lever 40 is an arm or offset member 78, which is bent at a right angle rearwardly and projects through an opening 79 in the wall 17, and lies normally in a deep groove 80 in the side wall 15; an elbow-like spring 81 acts to press the lever 75 into its normal position, as shown in full lines in Fig. 3, and also to retain the said lever in its outwardly swung position, as shown in dotted lines in the same figure.

By providing for the lost motion between the time lever and the shutter release lever, it becomes assured in the operation of the time lever that its member 78 will assume a position across the path of, and to intercept, the shutter and mirror before the lever 40 is engaged by the time lever, and thereby moved to its releasing position.

It will be here explained, reference being had to Fig. 3, that the angular spring 81 comprises a coil or coils at the elbow with spring arms extended therefrom angularly to each other.

The end of one spring arm is anchored in the side of the camera frame B at a point in the line vertically projecting from the pivot point 77, while the other arm of the spring is extended to connection with the time lever at a point, when the time lever is in its normal position, to the left of the aforementioned imaginary vertical line. The reaction of the spring is, therefore, to force the time lever outwardly or to the leftward.

When the time lever is swung to the position represented by the dotted lines in Fg. 3, so soon as the point of connection of the upper arm of the spring with the lever passes to the rightward of the aforementioned imaginary vertical line, the reaction of the spring becomes reversed, that is, its stress is such as to force the lever to the rightward; and hence, the time lever will be without liability of accidental displacement from either of the positions in which it is to be set.

A diaphragm plate 85 is attached to the straight part of the lever 75 at suitable point, and has provided in its offset broadened free end the diaphragm openings 86 and 87.

The opening 86 being normally in line with the lens 21, and of a size suitable for instantaneous pictures; and the opening 87 which is of a much smaller diameter is suitable for time pictures and is positioned at the lens axis as shown in dotted lines in Fig. 3 when the time lever is swung to its operating movement.

The operation of the above described camera to make an exposure is extremely simple,—and consists in first depressing or setting the mirror and shutter, by pressing down on the arm 39 of the setting lever 35, until, under the movement of the shutter the lever 40 shall have engaged the shutter flange 43. At the latter part of the movement of the shutter D to its set or locked position, the slide opener 60 engages and stops the movement, downward, of the slide G thus uncovering, as predetermined, a portion of the shutter opening 29, as shown in Figs. 2 and 5.

The shutter being now set and the mirror inclined to a forty-five degree angle the picture may be viewed upon the ground glass screen 10.

If, having decided upon the view to be photographed, it is considered desirable to make an "instantaneous" exposure, a slight pressure in an inward direction, on the press-button 44 swings lever 40 from its engagement with the shutter, which is then quickly impelled upward by the shutter spring 32, carrying the shutter opening 29 across the lens axis 21, and thereby permitting light transmitted through the lens to reach the photographic plate.

Just previous to the arrival of the shutter D, to the position shown in Fig. 4, (i. e. the normal position), the shutter slide G has been arrested by engagement with the stationary rib 70, insuring a closing of the shutter opening 29; and consequently guarding against any exposure of an already exposed, or another, plate on the resetting of the shutter.

If it had been desired to make a "time" exposure, after the shutter and mirror had been set as above described, then the press-button 44 would not have been touched, but by pushing the upper protruding end of the "time" lever 75 from its normal position the arm 78 of such lever is moved to the position shown in dotted lines in Fig. 3 and to an intercepting relation with the shutter, as will be understood on reference to Fig. 8, and would operate to arrest the movement of the shutter at a point where the shutter opening 29 would be in line with the lens 21.

It will be here explained that the swinging movement of the time lever 75, to bring it to its arresting relation to the shutter engages and swings the shutter locking and release lever 40, thereby freeing the shutter to be spring impelled to its place of arrest by the arm 70 of the "time" lever.

The desired length of time having been given, the exposure would be terminated by swinging the upper end of the time lever 75 back to its original position, leaving the shutter free to be moved to its normal position, slightly before which time the shutter slide G encounters the abutment 70 and is caused to assume its closing relation to the shutter opening 29.

It will be also explained, comparisons being made of Fig. 5 with Fig. 4, that when the abutment bar 62 carried by the pivotally mounted plate 60 is in the position for causing the slide to be but partially opened relatively to the light aperture 29, Fig. 5, the left hand extremity of the plate 60 has a position to serve as a lock against the operating movement of the time lever, so that, therefore, it becomes impossible to attempt to make a time picture when the slide but partially uncovers the light aperture; but when the plate 60 is adjusted, as shown in Fig. 4, by being swung upwardly to its extreme limit so that the abutment 62 is much earlier contacted against by the slide, whereby the slide will be forced to fully uncover the light aperture in the shutter member 28, the left hand extremity of the plate 60 is above and free from the arm 78 of the time lever, leaving the time lever free to be operated for the taking of a time picture.

I claim:—

1. In a reflecting photographic camera, the combination with a camera box having a front lens opening, a rear exposure opening, and a top screened opening, of a mirror carrying plate pivotally mounted at its rear edge within an upper portion of the box, having a shutter member curved and downwardly continuous from its free forward edge, and constructed with a light opening therein, means for downwardly swinging and "setting," and for reversely moving to its normal position, said pivotally mounted mirror carrying plate, a slide movable on the curved shutter member, and means for causing said slide to assume an open relation to the said light opening of said curved shutter member when the shutter is swung to its lower, set position, and means for causing said slide to assume a closed relation to said light opening when the shutter moves to its normal position.

2. In a reflecting photographic camera, the combination with a camera box having a front lens opening, a rear exposure opening and a top screened opening, of a mirror carrying plate pivotally mounted at its rear edge within an upper portion of the box, having a shutter member curved and downwardly continuous from its free forward edge, and constructed with a light opening therein, means for reversely operating said pivotally mounted shutter carrying plate, a slide movable on the curved shutter member, an abutment within a lower portion of the camera box, against which, in the setting movement of the shutter, the said slide contacts and by which it is opened relatively to said light opening, and an abutment within an upper forward part of the box against which said slide contacts, thereby closing said light opening during the upward movement of the shutter.

3. In a reflecting photographic camera, the combination with a camera box having a front lens opening, a rear, plate exposure opening and a top screened opening, of a mirror carrying plate pivotally mounted at its rear edge within an upper portion of the box, having a shutter member curved and downwardly continuous from its free forward edge, and constructed with a light opening therein, means for reversely operating said pivotally mounted plate, a slide movable on the curved shutter member, an abutment located and adjustable within a lower portion of the box against which in the setting movement of the shutter said slide contacts, and by which it is opened relatively to said light opening, in an extent as predetermined and corresponding to the adjustment of said abutment, and means for causing said slide to assume a closed relation to said light opening when the shutter moves upwardly to its normal position.

4. In a reflecting photographic camera, the combination with a camera box having a front lens opening, a rear plate exposure opening and a top screened opening, of a mirror carrying plate pivotally mounted at its rear edge within an upper portion of the box, having a shutter member curved and downwardly continuous from its free forward edge, said shutter member being provided with a light opening therein, and said plate having opposite side members extended from its pivotal point to and angularly continuous with said curved shutter member, means for reversely operating said pivoted appliance, a slide movable on the outer face of the curved shutter member, springs frictionally holding the said slide on the curved member, and means for causing said slide to assume respectively opened and closed relations to the said light opening when the shutter is swung to its lower set position and is approaching its normally upper position.

5. In a reflecting photographic camera, the combination with a camera box having a front lens opening, a rear, plate exposure opening and a top screened opening, of a mirror carrying plate pivotally mounted at its rear edge within an upper portion of the box, having a shutter member curved and downwardly continuous from its free forward edge, and constructed with a light opening therein, means for reversely operating said pivotally mounted plate, a slide movable on the curved shutter member, an abutment located within a lower portion of the box against which in the setting movement of the shutter said slide contacts, and by which it is opened relatively to said light opening, a part by which said abutment is bodily carried pivotally mounted within the camera box, and having a member by which it is adjustably moved, projecting to and accessible for operation at the exterior of the box, and means for causing said slide to assume a closed relation to said light opening when the shutter moves upwardly to its normal position.

6. In a reflecting photographic camera, the combination with a camera box having a front lens opening, a rear, plate exposure opening and a top screened opening, of a mirror carrying plate pivotally mounted at its rear edge within an upper portion of the box, having a shutter member curved and downwardly continuous from its free forward edge, and constructed with a light opening therein, means for reversely operating said pivotally mounted plate, a slide movable on the curved shutter member, an abutment located within a lower portion of the box against which in the setting movement of the shutter said slide contacts, and by which it is opened relatively to said light opening, a part by which said abutment is bodily carried pivotally mounted within the camera box, and having a member by which it is adjustably moved, projecting to, and accessible for operation at the exterior of the box, and constructed to constitute a pointer, a graduated scale on the outer side of the box with which said pointer registers, and means for causing said slide to assume a closed relation to said light opening when the shutter moves upwardly to its normal position.

7. In a camera of the character described, an oscillatory appliance comprising a top plate having a shutter member curved and downwardly continuous from its free forward edge and constructed with a light opening therein, and also comprising opposite side members, said oscillatory appliance being pivotally mounted at its rear upper portion within the camera box, a curved thin metal slide movable on the curved shutter member, having an edge portion thereof angularly downwardly bent, and having its end portions extended laterally beyond the side members of said pivoted appliance, a horizontal shaft constituting the pivot on which said appliance is mounted, spiral springs arranged along the sides of said side members having ends thereof engaged with said shaft and having connections by their opposite ends with the extended ends of the said slide-plate, means for reversely operating the said pivoted appliance, and an abutment within the camera box against which the angularly bent portion of the slide contacts in the downward or setting movement of the said device.

8. In a reflecting photographic camera, the combination with a camera box having a lens opening at its front, having an inclosed opening at its back for the disposition thereat of a photographic plate, and having an opening at its top covered by a ground glass screen, of a stationary appliance comprising a bottom plate and substantially triangular upwardly convergent side members, angularly continuous with the bottom plate, said appliance being confined in the camera box with its bottom plate and side members, forwardly projecting beyond the lower and side boundaries of said back opening, and with such bottom plate located above the bottom of the box, while the side members have their positions inwardly spaced from the adjacent side walls of the box, a plate pivotally mounted within the box at its rear edge, having side members arranged parallel with and outside of the side members of the stationary appliance, and also having a shutter member curved and downwardly continuous from the free forward edge of said plate, extended between and angularly continuous with the said side members, movable under the bottom plate of the stationary appliance, and provided with a light opening therethrough, a mirror operative in conjunction with said pivoted plate and in relation to the lens opening and screen, and means for imparting setting and releasing movements to the said pivotally mounted plate.

9. In a reflecting photographic camera, the combination with a camera box having a lens opening at its front, having an inclosed opening at its back for the disposition thereat of a photographic plate, and having an opening at its top covered by a ground glass screen, of a stationary appliance comprising a bottom plate and substantially triangular upwardly convergent side members, angularly continuous with the bottom plate, said appliance being confined in the camera box with its bottom plate and side members, forwardly projecting from the lower and side boundaries of said back opening, and with such bottom plate located above the bottom of the box, while the side members have their positions inwardly spaced from the adjacent side walls of the box, a shaft extending between, supported by and outwardly extended beyond the upper portions of the side members of said stationary appliance, and an oscillatory device pivotally hung at its rear upper corner on the outwardly projected extremities of said shaft and comprising a mirror carrying plate, side members arranged parallel with and outside of the side members of the stationary appliance, and a shutter member curved and downwardly continuous from the free forward edge of said plate and extending between and angularly continuous with the side members, movable under the bottom plate of the stationary appliance, and provided with a light opening therethrough, and means for imparting oscillatory setting and releasing movements to the said pivotally mounted device.

10. In a reflecting photographic camera the combination with the camera box, of a pivotally mounted device therein comprising a top plate, a curved forward extension having a light opening therein, and opposite side members, one having a lateral projection 43, a spring for elevating the pivoted device, a lever for depressing it, and a spring pressed release lever intermediately pivotally mounted within the side of the camera box, inclined to the plane of swinging movement of the pivoted device, adapted by its rear end to have a snap-catch engagement with said lateral projection, and having an operating member extended to the exterior of the box.

11. In a camera of the character described, the combination with a camera casing or frame having an upwardly opening groove in a side wall thereof, of a pivotally mounted triangular device comprising a top plate with a mirror thereat, a curved forward edge extension of said top plate, and opposite side members, a spring operative in an upward direction upon said device, a setting lever for said device consisting of a straight horizontal member,—engaged and supported in said upwardly opening side wall groove, an angular outer crank-like member, and an inner angular crank-like member having at its extremity an inward horizontal extension projecting over for engaging said pivoted device, and a release lever for engaging, and operative to liberate, the pivoted device.

12. In a camera, the combination with a camera casing or frame having an upwardly opening groove in a side wall thereof, of a device pivotally supported within said casing, and comprising a mirror, and a lever for coacting with said pivotally supported device consisting of a straight horizontal member,—engaged and supported in said upwardly opening side wall groove,—an angular external crank-like member, an internal angular crank-like member and an inward substantially horizontal member extending from the internal crank-like member to an engagement with the pivoted device.

13. In a camera of the character described, the combination with a pivoted device comprising a top, a mirror at such top, and a forwardly located downwardly curved extension having a light opening therein, a spring operative for an elevating stress on said device, a lever for setting the device, a release lever for automatically engaging, and operative to liberate, the device, and a time lever mounted for a lost-motion engagement relatively to the release lever and provided with a projection adapted to acquire a position to intercept the released pivoted device.

14. In a camera of the character described, the combination with a pivoted device comprising a top, a mirror at such top, a forwardly located downwardly curved extension having a light opening therein, and opposite side members, one thereof having a lateral projection, a spring operative for an elevating stress on said device, a lever for setting the device, a spring pressed horizontally arranged release lever, intermediately pivoted at the side of the camera, adapted by an end thereof to automatically engage the pivoted device, and having an outwardly projecting push button, and a time lever, vertically arranged adjacent and angularly to the release lever, having a lost motion constituting recess in its edge towards the release lever, and having at an upper portion thereof an angularly horizontally extended member for acquiring, under the swinging of the time lever a position for interrupting the upward swinging movement of the said pivoted device.

15. In a reflecting photographic camera, the combination with a camera box having a front lens opening, a rear plate exposure opening, and a top screened opening, of a quadrantal casing comprising a top with a mirror thereat, a curved member extended downwardly from the forward edge of the top member and having a light aperture therein and opposite side members, said casing being pivotally mounted at its rear upper portion within the camera box, a slide plate supported and frictionally movable on said apertured curved member, a spring for imparting an elevating stress to the quadrantal casing, a plate vertically mounted on the inside of the camera box having a downwardly extending arm carrying a transverse abutment bar adapted for engaging relations with the said slide plate, a lever for setting the quadrantal casing in its downwardly swung position, a release lever for automatically engaging and holding the quadrantal casing set, and a time lever vertically pivotally mounted at the side of the camera box having a lost motion engagement with the release lever and having a horizontal member adapted, when the time lever is inwardly swung, to have an interrupting relation to the quadrantal casing, said abutment carrying plate being adjustable relatively to the horizontal projection of the time lever for preventing under the one positioning of such lever the swinging movement of the time lever, and for leaving, under another positioning of the said plate the time lever free for its inward swinging movements for the purposes set forth.

16. In a reflecting photographic camera, the combination with a camera box having a front lens opening, a rear exposure opening, and a top screened opening, of a quadrantal casing having pivotally mounted within the box comprising a top with a mirror thereat, of a forwardly located downwardly curved extension having a light aperture therein, a setting lever for depressing said casing, a release lever for automatically engaging and holding said casing in its downwardly set position, and a time lever operative to movably engage the release lever for liberating the quadrantal casing, and having a member for acquiring a position for interrupting the elevating movement of the casing, and said time lever carrying a diaphragm having openings of different sizes for registry with the lens opening, accordingly as the time lever is either in its normal or in its casing intercepting position.

Signed by me at Springfield, Mass., in presence of two subscribing witnesses.

JULIUS D. GARFIELD.

Witnesses:
 WM. S. BELLOWS,
 G. R. DRISCOLL.